Oct. 1, 1935.  M. F. BATES  2,015,650
DIRECTIONAL GYROSCOPE
Filed March 10, 1933   2 Sheets-Sheet 1
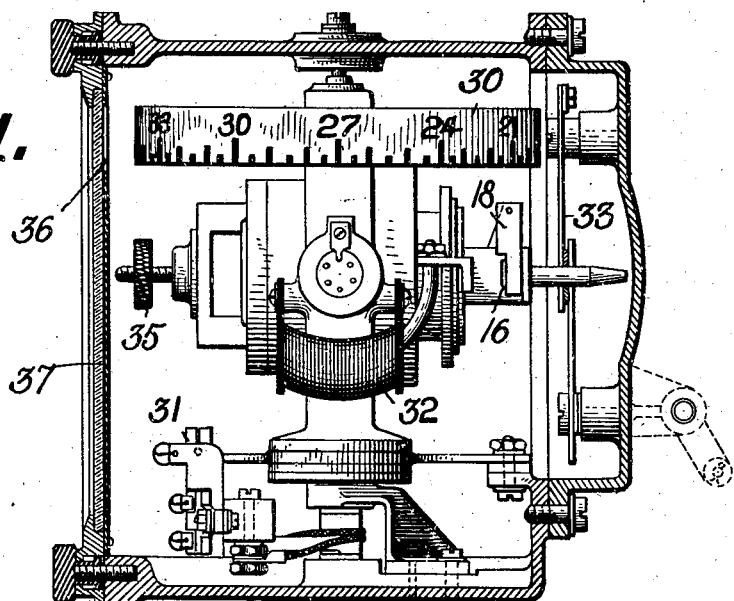
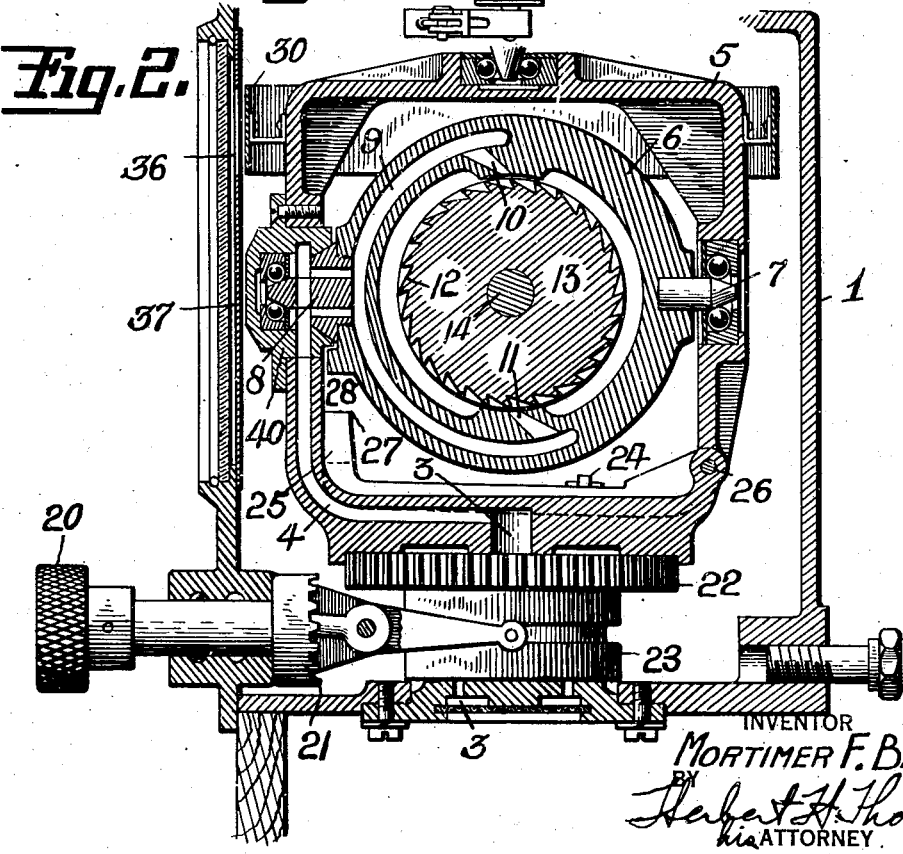
INVENTOR
MORTIMER F. BATES.
BY
Herbert H. Thompson
his ATTORNEY.

Oct. 1, 1935.  M. F. BATES  2,015,650
DIRECTIONAL GYROSCOPE
Filed March 10, 1933   2 Sheets-Sheet 2
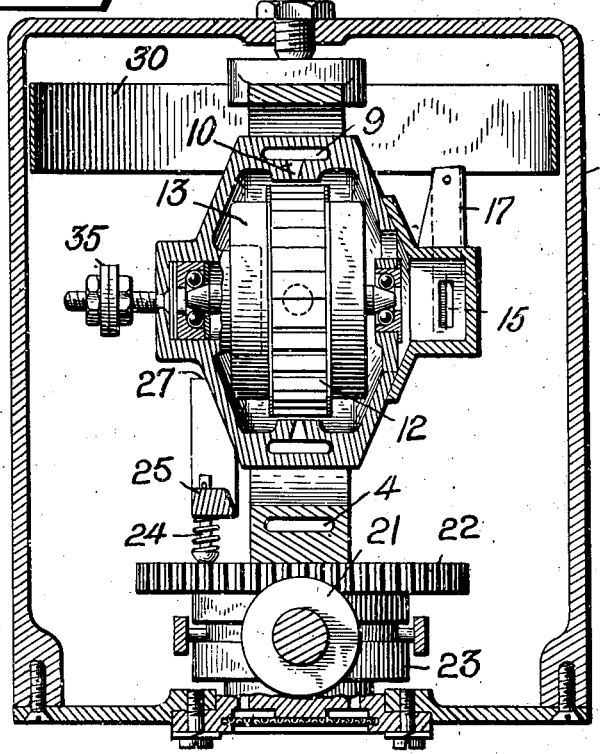
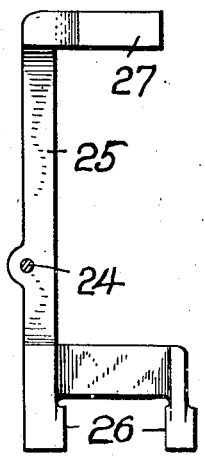
INVENTOR
MORTIMER F. BATES.
BY
his ATTORNEY.

Patented Oct. 1, 1935

2,015,650

UNITED STATES PATENT OFFICE 2,015,650

DIRECTIONAL GYROSCOPE

Mortimer F. Bates, Brooklyn, N. Y., assignor to Sperry Gyroscope Company, Inc., Brooklyn, N. Y., a corporation of New York Application March 10, 1933, Serial No. 660,204

2 Claims. (Cl. 33—204)

This invention relates to directional gyroscopes especially adapted to supplement magnetic compasses in the navigation of aircraft. Such gyroscopes are usually given three degrees of freedom so that they are uninfluenced by gravity or other acceleration forces and are usually mounted with a substantially horizontal spinning axis and for oscillation about a second horizontal axis at right angles thereto and for turning about a vertical axis. Such gyroscopes, however, are only effective as long as the spinning axis remains substantially horizontal. Therefore, means have been proposed, as for instance in the prior application of Bert G. Carlson, now Patent 1,982,637, dated December 4, 1934, assigned to the assignees of the present application, for preventing tilt of said axis. Such devices, however, do not function properly if the airplane permanently assumes a list or tilt, because the air erecting couple is referred to the position of the airplane rather than to the gravitational vertical. According to my invention I have eliminated the disturbing effect of the plane's position by using gravity as a baseline for detecting tilt of the gyro axle.

In my invention it is also possible to enclose the gyrorotor by a close fitting casing, since the air jets in my invention may tilt with the case. Enclosing the rotor is desirable since a close fitting housing eliminates stray and variable eddy effects and whatever turbulence takes place within the casing remains constant irrespective of the inclination. The resulting decrease of turbulence and windage loss also results in increased speed of the rotor.

Referring to the drawings showing several forms my invention may assume:

Fig. 1 is a vertical section through the casing disclosing a directional gyroscope, the gyroscope in this instance being used as a baseline for automatic steering.

Fig. 2 is a section through both the outer casing and the gyroscope showing an air-spun form of the invention in which the gyroscope is used merely as a direction indicator.

Fig. 3 is a vertical section taken at right angles to Fig. 2.

Fig. 4 is a detail of the locking means used for centralizing and locking the gyroscope when re-setting.

The gyroscope may be driven by any suitable means, such as electricity or air. In the form shown in Fig. 2, the gyroscope is air driven by air at atmospheric pressure by the continuous exhaustion of air from the instrument case. The entire gyroscope is enclosed within an air tight casing 1 from which air is exhausted by a suitable pump (not shown) through pipe coupling 2. Air at atmospheric pressure enters through an opening 3 in the bottom of the casing passing through the hollow bearing into passage 4 through the vertical ring 5. The rotor bearing casing 6 is pivoted within said vertical ring on horizontal trunnions 7 and 8, the latter being shown as hollow to admit air into the passages 9 in the gyro casing leading to one or more nozzles 10 and 11 which discharge air against the buckets or blades 12 in the periphery of the rotor 13. Trunnion 8 has a conical base which engages the housing 49 with very small clearance forming an air seal. The rotor is thus driven at high velocity and the jets exert no torque other than the spinning torque thereon because the jets tilt with the rotor about all axes except the spinning axis 14.

The used air emerges from the casing 6 through oppositely opening ports 15 and 16 (Figs. 3 and 1) in an extension from the gyro casing. A pair of blades or shutters 17 and 18 are pivoted one above each port, the blades normally equally covering the two ports and being cut out on opposite sides so that upon tilt of the casing about the trunnion axis 7—8 in one direction or the other one port will be increasingly uncovered while the other will become increasingly covered so that a differential reaction is secured in the proper direction to eliminate the tilt by precession about the horizontal axis due to said unbalanced torque about the vertical axis. The balance of the gyroscope about the horizontal axis 7—8 is secured by adjustable weight 35.

The gyroscope may be set by means of a setting knob 20 which may be pushed in to engage the crown gear 21 with the large gear 22 on the base of the vertical ring. At the same time the sleeve 23 is raised which lifts the pin 24 resting thereon and thereby the locking lever 25 pivoted on the vertical ring at 26 so as to bring the outer flat end thereof 27 against a flat portion 28 on the gyro casing to lock the same about its horizontal axis and to prevent precession. A compass card 30 is shown as secured to the vertical ring 5, the same being read through a slot 36 in mask 37 covering the face of the instrument.

In the form of the invention shown in Fig. 1, the gyroscope is electrically spun, the rotation of the wheel generating sufficient air pressure (either with or without an impeller thereon) to operate the differential air ports and shutter in the same manner as outlined in connection with Figs. 2 and 3. This gyroscope is also shown with a card 30 so that it may also be used as a directional gyroscope. When used for automatic steering, the controls are actuated from contacts 31 at the base of the gyroscope, course changes being effected either through shifting the contacts or through applying a torque about the horizontal axis of the gyroscope through the solenoid 32 or by caging the gyroscope through the locking fingers 33 and changing the course through other means, as explained in greater detail in prior application, now Patent 1,918,082, dated July 11, 1933, for Automatic pilots for dirigible craft, Bert G. Carlson, inventor.

By using pendulous shutters as a baseline for the gyroscope, I avoid errors due to changes in the trim of the airplane. In addition my invention eliminates the tilt with less deviation in azimuth than prior methods because the erecting torque is about the true horizontal axis and has no other component as is the case when attempt is made to apply this torque through the spinning jets.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. As a means for preventing tilt in a free or directional gyroscope, the combination with the rotor and rotor bearing casing, and means for supporting the same for freedom about a horizontal and a vertical axis with the spinning axis substantially horizontal and at right angles to said first named horizontal axis, of means for creating a differential air pressure within and without said casing, opposed ports in said casing along the horizontal axis thereof, and pendulous shutters pivoted adjacent thereto and having the inner edges normally symmetrically placed at said ports and adapted to create unbalance air reactions about said vertical axis upon tilt of said casing about its horizontal axis.

2. As a means for preventing tilt in a free or directional gyroscope, the combination with the rotor and rotor bearing casing, means for supporting the same for freedom about a horizontal and a vertical axis with the spinning axis substantially horizontal and at right angles to said first named horizontal axis, and electrical means for spinning said rotor, of opposed ports in said casing along the horizontal axis thereof through which the air set in motion by the rotation of the rotor escapes, and pendulous shutters pivoted above said ports and having the inner edges normally symmetrically placed at said ports and adapted to create unbalance air reactions about said vertical axis upon tilt of said casing about its horizontal axis.

MORTIMER F. BATES.